(12) United States Patent
Oota et al.

(10) Patent No.: US 10,913,244 B2
(45) Date of Patent: Feb. 9, 2021

(54) INTERLAYER FOR LAMINATED GLASS AND LAMINATED GLASS

(71) Applicant: SEKISUI CHEMICAL CO., LTD., Osaka (JP)

(72) Inventors: Yuusuke Oota, Shiga (JP); Ryuta Tsunoda, Shiga (JP); Hiromitsu Nishino, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/761,803

(22) PCT Filed: Sep. 28, 2016

(86) PCT No.: PCT/JP2016/078688
§ 371 (c)(1),
(2) Date: Mar. 20, 2018

(87) PCT Pub. No.: WO2017/057497
PCT Pub. Date: Apr. 6, 2017

(65) Prior Publication Data
US 2018/0264786 A1    Sep. 20, 2018

(30) Foreign Application Priority Data
Sep. 30, 2015    (JP) .................................. 2015-195408

(51) Int. Cl.
*B32B 17/10*    (2006.01)
*B29C 48/08*    (2019.01)
(Continued)

(52) U.S. Cl.
CPC ........ *B32B 17/10568* (2013.01); *B29C 48/08* (2019.02); *B29C 48/13* (2019.02);
(Continued)

(58) Field of Classification Search
CPC .. B32B 3/26; B32B 3/263; B32B 3/30; B32B 17/06; B32B 17/064; B32B 17/10;
(Continued)

(56) References Cited

U.S. PATENT DOCUMENTS 3,068,525 A    12/1962  Linton, Jr. et al.
3,488,715 A *  1/1970   Atkins .............. B32B 17/10871
                                                        428/441

(Continued)

FOREIGN PATENT DOCUMENTS

CA    1001374 A    12/1976
CN    103080037 A   5/2013
(Continued)

OTHER PUBLICATIONS

Supplementary European Search Report for the Application No. EP 16 851 668.0 dated Apr. 1, 2019.
(Continued)

*Primary Examiner* — Megha M Gaitonde
(74) *Attorney, Agent, or Firm* — Cheng Law Group, PLLC

(57) ABSTRACT

There is provided an interlayer film for a laminated glass having improved appearance which has a MD and TD direction; and one end, and another end being opposite side of and thicker than the one end. The one end and other end are positioned on both sides of the interlayer film in the TD direction. When the distance between the one end and other end is X, the absolute value for the difference between the largest and smallest thermal shrinkage ratios from among three thermal shrinkage ratios is 15% or less. The three thermal shrinkage ratios are positioned from the one end towards the other end in MD direction with a first thermal shrinkage ratio at 150° C. at a first position at 0.05X, a second thermal shrinkage ratio at 150° C. at a second (Continued)

position at 0.5X, and a third thermal shrinkage ratio at 150° C. at a third position at 0.95X.

17 Claims, 4 Drawing Sheets

(51) Int. Cl.
*B29C 48/13* (2019.01)
*B29C 48/21* (2019.01)
*B60J 1/02* (2006.01)
*B60J 1/00* (2006.01)
*B32B 3/26* (2006.01)
*B29K 31/00* (2006.01)
*B29L 31/30* (2006.01)
*B29L 31/00* (2006.01)
*B60K 35/00* (2006.01)

(52) U.S. Cl.
CPC .............. *B29C 48/21* (2019.02); *B32B 3/263* (2013.01); *B32B 17/10036* (2013.01); *B32B 17/1055* (2013.01); *B32B 17/10541* (2013.01); *B32B 17/10633* (2013.01); *B32B 17/10651* (2013.01); *B32B 17/10678* (2013.01); *B32B 17/10761* (2013.01); *B60J 1/00* (2013.01); *B60J 1/02* (2013.01); *B29K 2031/04* (2013.01); *B29L 2031/30* (2013.01); *B29L 2031/778* (2013.01); *B32B 2250/03* (2013.01); *B32B 2307/102* (2013.01); *B32B 2307/736* (2013.01); *B32B 2605/006* (2013.01); *B60K 35/00* (2013.01); *B60K 2370/334* (2019.05)

(58) Field of Classification Search
CPC .......... B32B 17/10165; B32B 17/1055; B32B 17/10559; B32B 17/10761; B32B 17/10568; B32B 17/10577; B32B 17/10587; B32B 27/06; B32B 27/30; B32B 27/306; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959
USPC ....... 428/105, 112, 141, 142, 147, 156, 159, 428/161, 162, 163, 167, 172, 173, 212, 428/213, 214
See application file for complete search history.

(56) References Cited

U.S. PATENT DOCUMENTS

| | | | |
|---|---|---|---|
| 4,226,818 A * | 10/1980 | Brower | B29C 53/32 264/342 RE |
| 2004/0053006 A1 | 3/2004 | Omizu et al. | |
| 2006/0210776 A1 | 9/2006 | Lu et al. | |
| 2007/0009714 A1 | 1/2007 | Lee et al. | |
| 2007/0148419 A1 | 6/2007 | Wiedemann et al. | |
| 2011/0097572 A1 | 4/2011 | Yonekura et al. | |
| 2012/0288722 A1 | 11/2012 | Iwamoto et al. | |
| 2013/0149503 A1 | 6/2013 | Yamamoto et al. | |
| 2013/0236711 A1* | 9/2013 | Lu | B32B 17/10036 428/213 |
| 2014/0020759 A1 | 1/2014 | Oda et al. | |
| 2015/0064428 A1 | 3/2015 | Matsuo et al. | |
| 2015/0217540 A1 | 8/2015 | Keller | |

FOREIGN PATENT DOCUMENTS

| | | |
|---|---|---|
| CN | 103476841 A | 12/2013 |
| CN | 104185547 A | 12/2014 |
| GB | 863415 A | 3/1961 |
| JP | 48-51964 A | 7/1973 |
| JP | 60-21834 A | 2/1985 |
| JP | 4-502525 A | 5/1992 |
| JP | 2004-203680 A | 7/2004 |
| JP | 2005-68006 A | 3/2005 |
| JP | 2007-70200 A | 3/2007 |
| JP | 2010-215493 A | 9/2010 |
| JP | 2012-106932 A | 6/2012 |
| JP | 2014-210433 A | 11/2014 |
| KR | 10-2012-0105010 A | 9/2012 |
| WO | WO-91/06031 A1 | 5/1991 |

OTHER PUBLICATIONS

The First Office Action for the Application No. 201680056929.3 from The State Intellectual Property Office of the People's Republic of China dated Apr. 15, 2019.
Written Opinion of the International Searching Authority (PCT/ISA/237) for the Application No. PCT/JP2016/078688 dated Nov. 15, 2016 (English Translation mailed Apr. 12, 2018).
International Search Report for the Application No. PCT/JP2016/078688 dated Nov. 15, 2016.
Written Opinion of the International Searching Authority (PCT/ISA/237) for the Application No. PCT/JP2016/078688 dated Nov. 15, 2016.
European Office Action for the Application No. 16 851 668.0 dated Feb. 5, 2020.
European Office Action for Application No. EP 16 851 668.0 dated Sep. 7, 2020.

* cited by examiner

[FIG. 1]
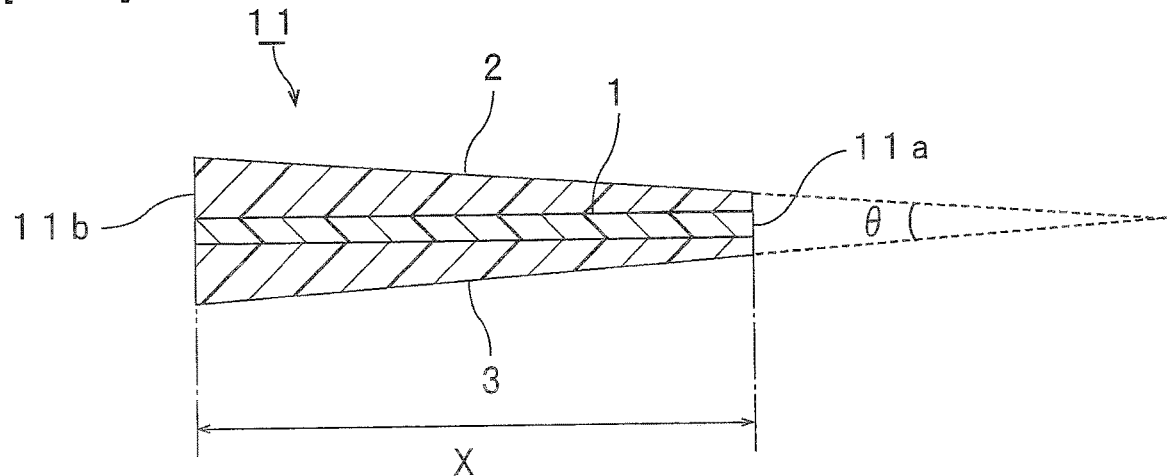
[FIG. 2]
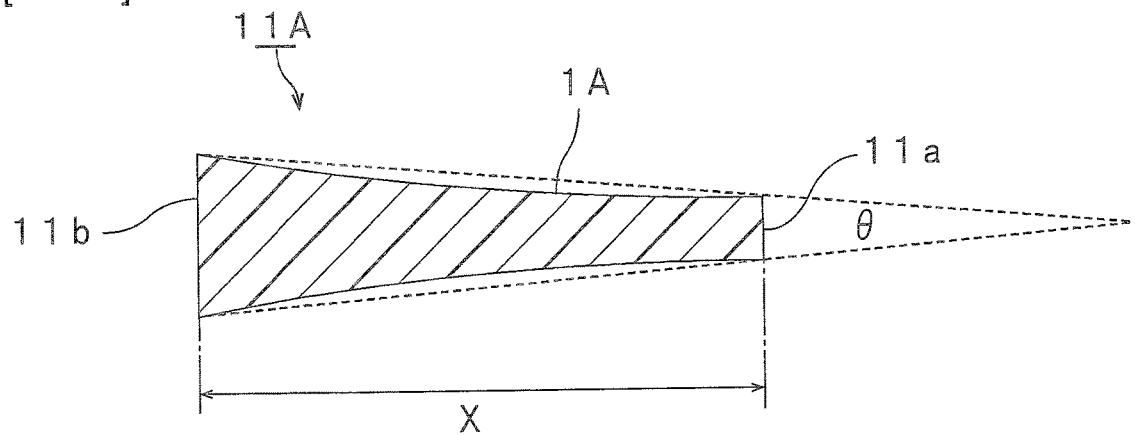
[FIG. 3]
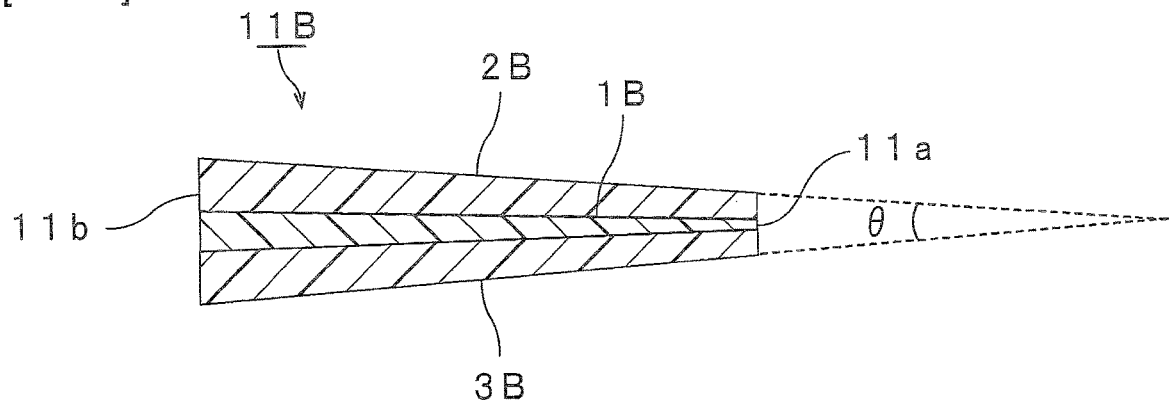

[FIG. 4]
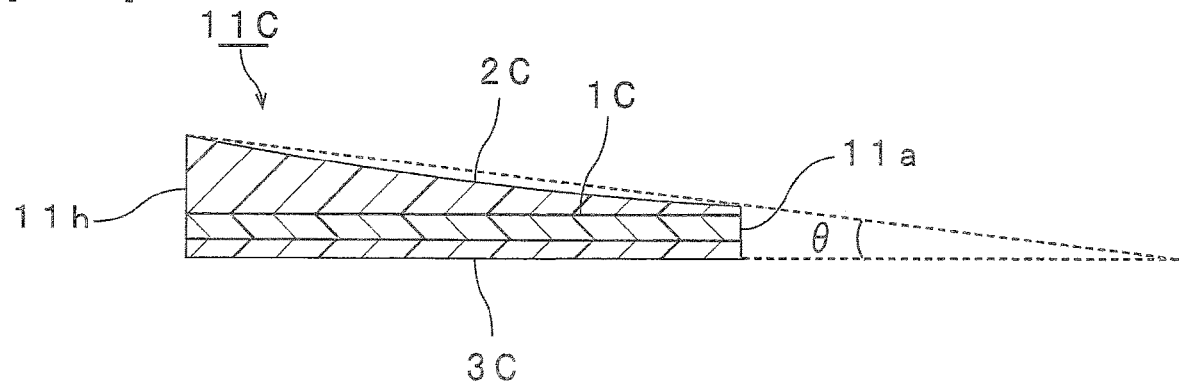
[FIG. 5]
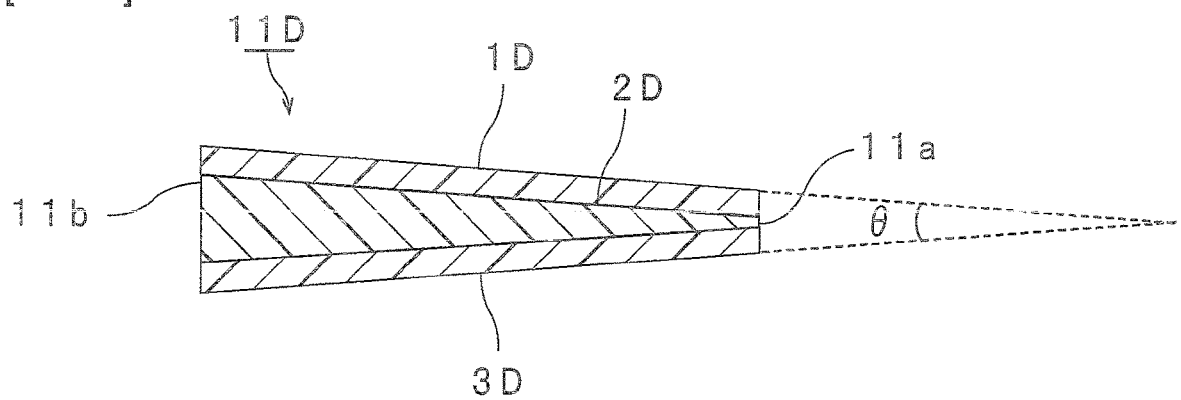
[FIG. 6]
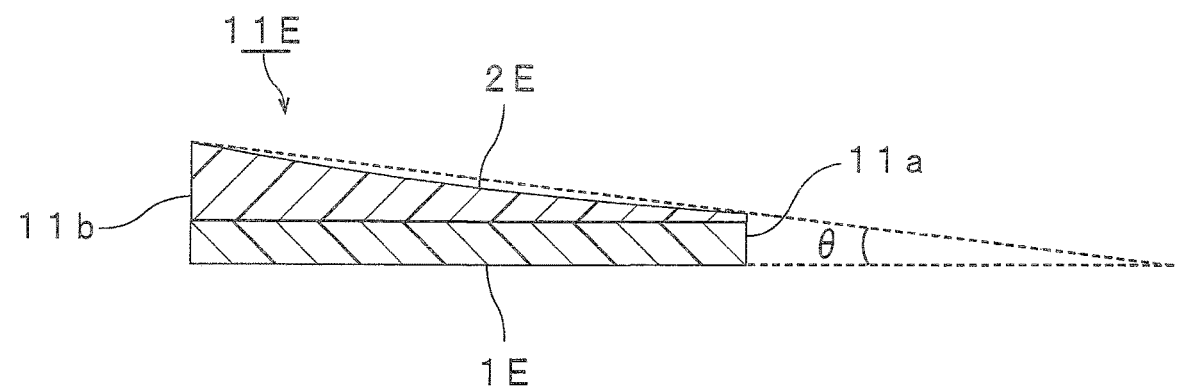

[FIG. 7]
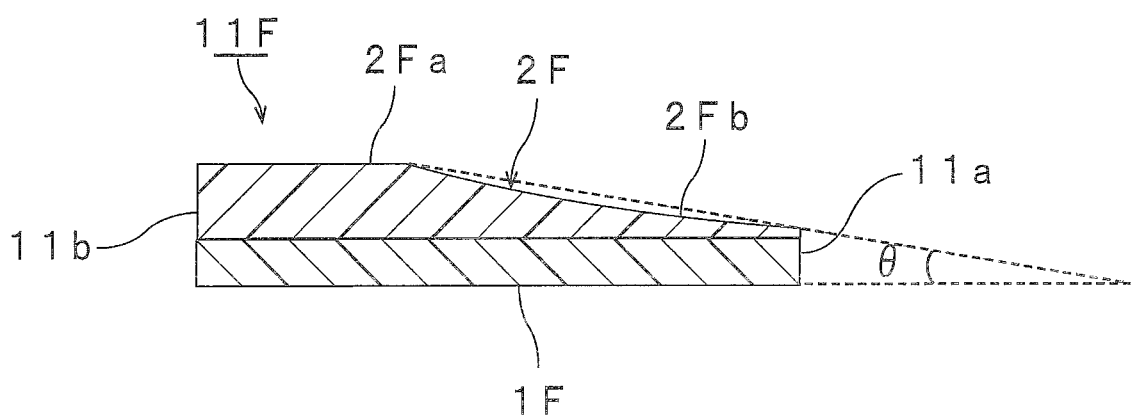
[FIG. 8]
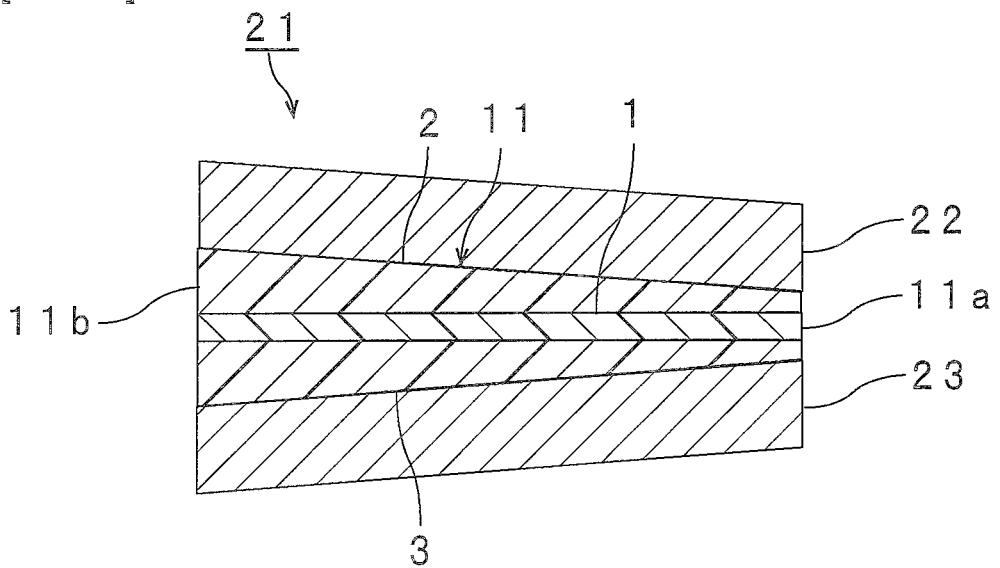

[FIG. 9]
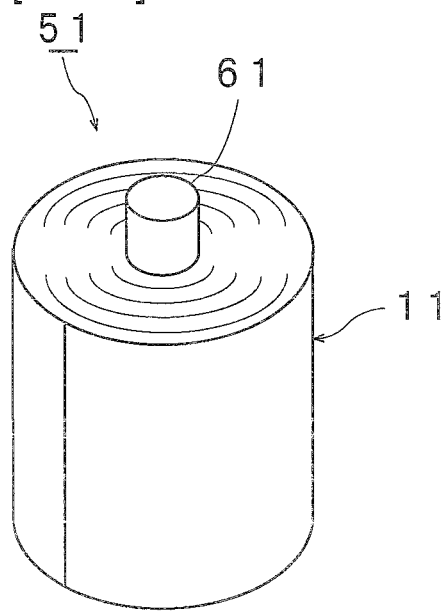
[FIG. 10]
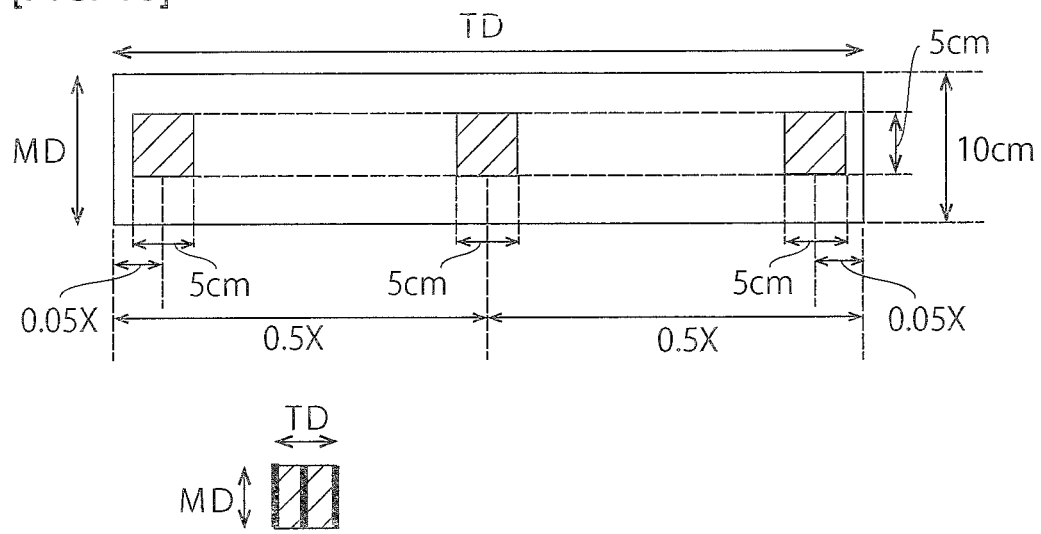

INTERLAYER FOR LAMINATED GLASS AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount more than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

Moreover, as the laminated glass used for automobiles, a head-up display (HUD) has been known. In the HUD, on the windshield of an automobile, measured information such as the speed which is traveling data of the automobile and the like can be displayed.

In order to suppress double images, a wedge-shaped interlayer film has been used. The following Patent Document 2 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hard to be observed doubly and the visibility of a driver is not hindered.

RELATED ART DOCUMENTS

Patent Documents

Patent Document 1: JP 2007-070200 A
Patent Document 2: JP H4-502525 T

SUMMARY OF THE INVENTION

Problems to be Solved by the Invention

In a wedge-shaped interlayer film, one end and the other end are different from each other in thickness. As such, in a wedge-shaped interlayer film, wrinkles are easily generated. In particular, when a wedge-shaped interlayer film is wound and formed into a roll body before used for obtaining laminated glass and a sheet of laminated glass is prepared with the use of the roll body, wrinkles are easily generated in the interlayer film. As a result, a poor appearance of laminated glass easily occurs.

Moreover, at the time of preparing laminated glass, an interlayer film is heated. There is also a case where, due to this heating, wrinkles are generated in the interlayer film and wrinkles increase. When wrinkles increase in the interlayer film, a poor appearance of laminated glass becomes further easy to occur.

An object of the present invention is to provide an interlayer film for laminated glass enabling laminated glass in which a poor appearance is suppressed to be obtained because wrinkles are hardly generated in the interlayer film. Moreover, the present invention is also aimed at providing laminated glass prepared with the interlayer film for laminated glass.

Means for Solving the Problems

According to a broad aspect of the present invention, there is provided an interlayer film for laminated glass (in the present specification, sometimes abbreviated as "an interlayer film") having an MD direction and a TD direction and having one end and the other end being at the opposite side of the one end and having a thickness thicker than the one end, the one end and the other end being respectively positioned at both sides in the TD direction of the interlayer film, and when a distance between the one end and the other end is defined as X, the absolute value of a difference between the largest thermal shrinkage ratio among three thermal shrinkage ratios of the first thermal shrinkage ratio at 150° C. in the MD direction on a first position apart from the one end by 0.05X toward the other end, the second thermal shrinkage ratio at 150° C. in the MD direction on a second position apart from the one end by 0.5X toward the other end, and the third thermal shrinkage ratio at 150° C. in the MD direction on a third position apart from the one end by 0.95X toward the other end and the smallest thermal shrinkage ratio among the three thermal shrinkage ratios being 15% or less.

In a specific aspect of the interlayer film according to the present invention, the largest thermal shrinkage ratio among the three thermal shrinkage ratios is 50% or less.

In a specific aspect of the interlayer film according to the present invention, the interlayer film contains a thermoplastic resin.

In a specific aspect of the interlayer film according to the present invention, the interlayer film is provided with a first layer and a second layer arranged on a first surface side of the first layer and the second layer is a surface layer of the interlayer film.

In a specific aspect of the interlayer film according to the present invention, the first layer contains a thermoplastic resin and the second layer contains a thermoplastic resin.

In a specific aspect of the interlayer film according to the present invention, the thermoplastic resin in the first layer is a polyvinyl acetal resin and the thermoplastic resin in the second layer is a polyvinyl acetal resin.

In a specific aspect of the interlayer film according to the present invention, the content of the hydroxyl group of the polyvinyl acetal resin in the first layer is lower than the content of the hydroxyl group of the polyvinyl acetal resin in the second layer.

In a specific aspect of the interlayer film according to the present invention, the first layer contains a plasticizer and the second layer contains a plasticizer.

In a specific aspect of the interlayer film according to the present invention, the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

In a specific aspect of the interlayer film according to the present invention, the interlayer film is provided with a third layer arranged on the opposite side to the first surface side of the first layer and the third layer is a surface layer of the interlayer film.

In a specific aspect of the interlayer film according to the present invention, the third layer contains a thermoplastic resin and a plasticizer.

In a specific aspect of the interlayer film according to the present invention, the interlayer film has a portion with a sectional shape in the thickness direction of a wedge-like shape.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

Since the interlayer film for laminated glass according to the present invention has an MD direction and a TD direction and has one end and the other end being at the opposite side of the one end and having a thickness thicker than the one end, the one end and the other end are respectively positioned at both sides in the TD direction of the interlayer film, and when a distance between the one end and the other end is defined as X, the absolute value of a difference between the largest thermal shrinkage ratio among three thermal shrinkage ratios of the first thermal shrinkage ratio at 150° C. in the MD direction on a first position apart from the one end by 0.05X toward the other end, the second thermal shrinkage ratio at 150° C. in the MD direction on a second position apart from the one end by 0.5X toward the other end, and the third thermal shrinkage ratio at 150° C. in the MD direction on a third position apart from the one end by 0.95X toward the other end and the smallest thermal shrinkage ratio among the three thermal shrinkage ratios is 15% or less, wrinkles are hardly generated in the interlayer film and laminated glass in which a poor appearance is suppressed can be obtained.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view showing the first modified example of a sectional shape in the thickness direction of an interlayer film for laminated glass.

FIG. 4 is a sectional view showing the second modified example of a sectional shape in the thickness direction of an interlayer film for laminated glass.

FIG. 5 is a sectional view showing the third modified example of a sectional shape in the thickness direction of an interlayer film for laminated glass.

FIG. 6 is a sectional view showing the fourth modified example of a sectional shape in the thickness direction of an interlayer film for laminated glass.

FIG. 7 is a sectional view showing the fifth modified example of a sectional shape in the thickness direction of an interlayer film for laminated glass.

FIG. 8 is a sectional view showing an example of laminated glass prepared with the interlayer film for laminated glass shown in FIG. 1.

FIG. 9 is a perspective view schematically showing a roll body prepared by winding the interlayer film for laminated glass shown in FIG. 1.

FIG. 10 is a figure for illustrating an interlayer film portion (test piece) for measuring the thermal shrinkage ratio.

MODE(S) FOR CARRYING OUT THE INVENTION

Hereinafter, the details of the present invention will be described.

The interlayer film for laminated glass (in the present specification, sometimes abbreviated as "the interlayer film") according to the present invention has an MD direction and a TD direction. The interlayer film according to the present invention has one end and the other end being at the opposite side of the one end and having a thickness thicker than the one end. In the interlayer film according to the present invention, the one end and the other end are respectively positioned at both sides in the TD direction of the interlayer film.

In the interlayer film according to the present invention, the distance between the one end and the other end is defined as X. In the interlayer film according to the present invention, three thermal shrinkage ratios of the first thermal shrinkage ratio at 150° C. in the MD direction on a first position apart from the one end by 0.05X toward the other end, the second thermal shrinkage ratio at 150° C. in the MD direction on a second position apart from the one end by 0.5X toward the other end, and the third thermal shrinkage ratio at 150° C. in the MD direction on a third position apart from the one end by 0.95X toward the other end are measured. In the interlayer film according to the present invention, the absolute value of a difference between the largest thermal shrinkage ratio among the three thermal shrinkage ratios and the smallest thermal shrinkage ratio among those is 15% or less.

In the interlayer film according the present invention, since the thickness of one end of the interlayer film is thinner than the thickness of the other end thereof, for example, when laminated glass prepared with the interlayer film is used for a head-up display (HUD), even if measured information such as the speed which is traveling data of an automobile or the like is displayed on the display, it is possible to suppress the measured information from being doubly observed.

Furthermore, since the interlayer film according to the present invention is provided with the above-mentioned configuration, wrinkles are hardly generated in the interlayer film and laminated glass in which a poor appearance is suppressed can be obtained.

Moreover, the interlayer film is sometimes wound and formed into a roll body before used for obtaining laminated glass. When the MD direction of the interlayer film corresponds to the length direction and the TD direction of the interlayer film corresponds to the width direction, the interlayer film is wound in the MD direction (length direction) of the interlayer film. Both ends (one end and the other end) in the TD direction (width direction) of the interlayer film are respectively positioned at both sides in the axis direction of the roll. In this case, since interlayer film portions disposed respectively at both sides in the axis direction of the roll are different from each other in thickness, wrinkles are easily generated in the interlayer film and it is difficult to wind the interlayer film without causing wrinkles. In particular, at the one end side being relatively thin in thickness, wrinkles are easily generated in the interlayer film. When an interlayer film portion is drawn out from a roll body of the interlayer film in which wrinkles are generated to prepare a sheet of laminated glass, an interlayer film in a state of having wrinkles is liable to be sandwiched between two lamination glass members. As a result, a poor appearance of laminated glass occurs. For example, poor degassing occurs and voids are sometimes generated between the lamination glass member and the interlayer film. Furthermore, when the interlayer film is heated at the time of preparing laminated glass, wrinkles in the interlayer film positioned between two lamination glass members increase and a poor appearance of laminated glass becomes further easy to occur.

Since the interlayer film according to the present invention is provided with the above-mentioned configuration, even if the interlayer film is wound and formed into a roll body, wrinkles can be made difficult to be generated in the interlayer film. In this connection, even when the interlayer film is not formed into a roll body, it is desirable that wrinkles not be generated in the interlayer film. In the present invention, even if the interlayer film is not formed into a roll body, wrinkles can be made difficult to be generated in the interlayer film.

Moreover, the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film.

When the interlayer film is obtained by melt extrusion processing, there is a tendency for an end part thereof to have a residual stress and there is a tendency for the thermal shrinkage ratio in the MD direction to be liable to become large. In contrast, in the present invention, the three thermal shrinkage ratios at 150° C. in the MD direction are controlled within the above-mentioned range and wrinkles can be made difficult to be generated in the interlayer film.

From the viewpoint of further suppressing wrinkles in the interlayer film, the absolute value of a difference between the largest thermal shrinkage ratio and the smallest thermal shrinkage ratio is preferably 13% or less, more preferably 11% or less, and further preferably 10% or less. The lower limit of the absolute value of a difference between the largest thermal shrinkage ratio and the smallest thermal shrinkage ratio is not particularly limited.

From the viewpoint of further suppressing wrinkles in the interlayer film, the largest thermal shrinkage ratio among the three thermal shrinkage ratios is preferably 50% or less, more preferably 48% or less, further preferably 46% or less, and especially preferably 45% or less. The lower limit of the largest thermal shrinkage ratio among the three thermal shrinkage ratios is not particularly limited. The largest thermal shrinkage ratio among the three thermal shrinkage ratios is preferably more than 20%, more preferably 22% or more, and further preferably 24% or more.

Examples of a method of controlling the thermal shrinkage ratio include a method of holding an interlayer film extruded within a constant temperature range for a constant period of time at the time of obtaining the interlayer film by melt extrusion molding, a method of winding an interlayer film applied with a uniform tensile force over the whole area in the TD direction at the time of producing the interlayer film, or the like.

The thermal shrinkage ratio is measured in the following manner.

FIG. 10 is a figure for illustrating an interlayer film portion (test piece) for measuring the thermal shrinkage ratio.

The interlayer film obtained is cut from one end to the other end in the TD direction so as to have a length dimension in the MD direction of 10 cm. After cutting, for stabilizing the film, the moisture control thereof is performed for 2 days at 20° C. and a humidity of 30% RH. Afterward, as shown in FIG. 10, from an area centered on a first position apart from the one end by 0.05X toward the other end, an area centered on a second position apart from the one end by 0.5X toward the other end, and an area centered on a third position apart from the one end by 0.95X toward the other end, respective test pieces are cut out. The test piece has a square shape of 5 cm in the MD direction and 5 cm in the TD direction. The test piece is cut out so that the center thereof is aligned with the midpoint in the MD direction of the interlayer film obtained. The test pieces are cut out so as to be centered on the first position, the second position, and the third position, respectively. However, when a first position apart from one end by 0.05X toward the other end is not apart from the one end by 2.5 cm or more, a test piece is cut out so that the one end constitutes a side of the test piece. When a third position apart from one end by 0.95X toward the other end is not apart from the other end by 2.5 cm or more, a test piece is cut out so that the other end constitutes a side of the test piece.

The test pieces obtained are horizontally laid on a fluororesin sheet to be allowed to stand at 150° C. for 0.5 hours. The test piece is measured for the dimension in the MD direction before and after allowed to stand at 150° C. for 0.5 hours to determine a thermal shrinkage ratio of the test piece after allowed to stand at 150° C. for 0.5 hours.

One test piece is measured for the thermal shrinkage ratio in the MD direction at three locations of both side end parts in the TD direction of one test piece and the center part thereof (three locations indicated as heavy line parts in FIG. 10). An average value of the three measured values is defined as the thermal shrinkage ratio in the MD direction of one test piece.

Thermal shrinkage ratio (%)=((Dimension in $MD$ direction before heating−Dimension in $MD$ direction after heating)/Dimension in $MD$ direction before heating)×100(%)

Hereinafter, specific embodiments of the present invention will be described with reference to the drawings.

FIG. 1 is a sectional view schematically showing an interlayer film for laminated glass in accordance with a first embodiment of the present invention.

In FIG. 1, a section in the thickness direction of an interlayer film 11 is shown. In this connection, in FIG. 1 and a figure described below, for convenience of illustration, the thicknesses of an interlayer film and respective layers constituting the interlayer film and the wedge angle θ are shown so as to be different from actual thicknesses thereof and an actual wedge angle.

The interlayer film 11 is provided with a first layer 1 (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film. A lamination glass member is layered on the surface layer.

The interlayer film 11 has one end 11a and the other end 11b at the opposite side of the one end 11a. The one end 1a and the other end 11b are end parts of both sides facing each other. The sectional shape in the thickness direction of each of the second layer 2 and the third layer is a wedge-like shape. The sectional shape in the thickness direction of the first layer 1 is a rectangular shape. The thickness of the one end 11a side of each of the second layer 2 and the third layer 3 is thinner than that of the other end 11b side thereof. Accordingly, the thickness of the one end 11a of the interlayer film 11 is thinner than the thickness of the other end 11b thereof. Accordingly, the interlayer film 11 has a region being thin in thickness and a region being thick in thickness.

The difference between the maximum thickness and the minimum thickness in the first layer 1 is smaller than the difference between the maximum thickness and the minimum thickness in the second layer 2. The difference between the maximum thickness and the minimum thickness in the first layer 1 is smaller than the difference between the maximum thickness and the minimum thickness in the third layer 3.

In this connection, in FIG. 1, the right-left direction (crosswise direction) corresponds to the TD direction, the up-down direction (vertical direction) corresponds to the thickness direction, and the direction connecting the front side and the inner side corresponds to the MD direction.

FIG. 9 is a perspective view schematically showing a roll body prepared by winding the interlayer film for laminated glass shown in FIG. 1.

The interlayer film 11 may be wound and formed into a roll body 51 of the interlayer film 11.

The roll body 51 shown in FIG. 9 is provided with a winding core 61 and the interlayer film 11. The interlayer film 11 is wound around an outer periphery of the winding core 61.

FIG. 2 is a sectional view schematically showing an interlayer film for laminated glass in accordance with a second embodiment of the present invention.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The sectional shape in the thickness direction of the first layer 1A corresponding to the interlayer film 11A is a wedge-like shape. The interlayer film 11A has one end 11a and the other end 11b at the opposite side of the one end 11a. The one end 11a and the other end 11b are end parts of both sides facing each other. The thickness of the one end 11a of the interlayer film 11A is thinner than the thickness of the other end 11b thereof. Accordingly, the first layer 1A corresponding to the interlayer film 11A has a region being thin in thickness and a region being thick in thickness.

The interlayer film 11 shown in FIG. 1 has a structure in which the rectangular-shaped first layer 1 is sandwiched between the wedge-shaped second layer 2 and the wedge-shaped third layer 3. In FIGS. 3 to 7, the first to fifth modified examples in which the interlayer film is changed in the shape of each layer are shown.

An interlayer film 11B in accordance with the first modified example shown in FIG. 3 is provided with a first layer 1B having a sectional shape in the thickness direction of a wedge-like shape, a second layer 2B having a sectional shape in the thickness direction of a wedge-like shape, and a third layer 3B having a sectional shape in the thickness direction of a wedge-like shape. The first layer 1B is arranged between the second layer 2B and the third layer 3B to be sandwiched therebetween.

The thickness of one end 11a side of each of the first layer 1B, the second layer 2B, and the third layer 3B is thinner than that of the other end 11b side thereof. Accordingly, the interlayer film 11B has a region being thin in thickness and a region being thick in thickness.

In the interlayer film 11B, the amount of change in the thickness of the first layer 1B is smaller than the amount of change in the thickness of each of the second layer 2B and the third layer 3B.

An interlayer film 11C in accordance with the second modified example shown in FIG. 4 is provided with a first layer 1C having a sectional shape in the thickness direction of a rectangular shape, a second layer 2C having a sectional shape in the thickness direction of a wedge-like shape, and a third layer 3C having a sectional shape in the thickness direction of a rectangular shape. The first layer 10 is arranged between the second layer 2C and the third layer 3C to be sandwiched therebetween. The thickness of one end 11a side of the second layer 2C is thinner than that of the other end 11b side thereof. Accordingly, the interlayer film 11C has a region being thin in thickness and a region being thick in thickness. A single-layered interlayer film having the same shape as the interlayer film 11C may be adopted.

An interlayer film 11D in accordance with the third modified example shown in FIG. 5 is provided with a first layer 1D having a sectional shape in the thickness direction of a rectangular shape, a second layer 2D having a sectional shape in the thickness direction of a wedge-like shape, and a third layer 3D having a sectional shape in the thickness direction of a rectangular shape. The second layer 2D is arranged between the first layer 1D and the third layer 3D to be sandwiched therebetween. The thickness of one end 11a side of the second layer 2D is thinner than that of the other end 11b side thereof. Accordingly, the interlayer film 11D has a region being thin in thickness and a region being thick in thickness.

An interlayer film 11E in accordance with the fourth modified example shown in FIG. 6 is provided with a first layer 1E having a sectional shape in the thickness direction of a rectangular shape and a second layer 2E having a sectional shape in the thickness direction of a wedge-like shape. The second layer 2E is arranged on a first surface side of the first layer 1E to be layered thereon. The thickness of one end 11a side of the second layer 2E is thinner than that of the other end 11b side thereof. Accordingly, the interlayer film 11E has a region being thin in thickness and a region being thick in thickness.

An interlayer film 11F in accordance with the fifth modified example shown in FIG. 7 is provided with a first layer 1F having a sectional shape in the thickness direction of a rectangular shape and a second layer 2F having a portion 2Fa with a sectional shape in the thickness direction of a rectangular shape and a portion 2Fb with a sectional shape in the thickness direction of a wedge-like shape. The second layer 2F is arranged on a first surface side of the first layer 1F to be layered thereon. The thickness of one end 11a side of the second layer 2F is thinner than that of the other end 11b side thereof. Accordingly, the interlayer film 11F has a region being thin in thickness and a region being thick in thickness. A single-layered interlayer film having the same shape as the interlayer film 11F may be adopted.

It is preferred that the interlayer film have portion with a sectional shape in the thickness direction of a wedge-like shape. It is preferred that the interlayer film have a portion where the thickness is gradually increased from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In order to suppress double images, the wedge angle θ of the interlayer film can be appropriately set according to the fitting angle of laminated glass. From the viewpoint of further suppressing double images, the wedge angle θ of the interlayer film is preferably 0.01 mrad (0.0006 degrees) or more, more preferably 0.2 mrad (0.0115 degrees) or more, and preferably 2 mrad (0.1146 degrees) or less, and more preferably 0.7 mrad (0.0401 degrees) or less. The wedge angle θ of an interlayer film is an interior angle formed at the intersection point between a straight line connecting a point on the first surface of the maximum thickness part of the interlayer film and a point on the first surface of the minimum thickness part thereof and a straight line connecting a point on the second surface of the maximum thickness part of the interlayer film and a point on the second surface of the minimum thickness part thereof.

The interlayer film may have a colored band area in a partial region. The interlayer film may have a colored region in a partial region. When a multi-layered interlayer film has a colored band area or a colored region, it is preferred that a surface layer have a colored band area or a colored region. However, an intermediate layer may have a colored band area or a colored region. For example, at the time of extrusion-molding an interlayer film or at the time of extrusion-molding the respective layers of the interlayer film, a prescribed region can be blended with a coloring agent to form the colored band area or the colored region.

The thickness of the interlayer film is not particularly limited. The thickness of the interlayer film refers to the total thickness of the respective layers constituting the interlayer film. Thus, in the case of a multi-layered interlayer film 11, the thickness of the interlayer film 11 refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more, and preferably 3 mm or less, more preferably 2 mm, and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that one end of the interlayer film have a minimum thickness and the other end of the interlayer film have a maximum thickness.

In the interlayer films 11, 11A, 11B, 11C, 11D, 11E, and 11F, the one end 11a has a minimum thickness and the other end 11b has a maximum thickness.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, and preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is preferably 0.001 mm or more, more preferably 0.1 mm or more, further preferably 0.2 mm or more, and preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

The interlayer film according to the present invention has a one-layer structure or a two or more-layer structure. The interlayer film according to the present invention may have a one-layer structure, may have a two or more-layer structure, and may have a three or more-layer structure. The interlayer film according to the present invention is provided with a first layer. The interlayer film according to the present invention may be a single-layered interlayer film provided with only a first layer and may be a multi-layered interlayer film provided with a first layer and another layer.

The interlayer film may have a two or more-layer structure and may be provided with a second layer in addition to a first layer. It is preferred that the interlayer film be provided with the second layer as a surface layer of the interlayer film. When the interlayer film is provided with the second layer, the second layer is arranged on a first surface side of the first layer. In this case, the second layer may be directly layered on the first layer and an additional layer may be arranged between the first layer and the second layer.

The interlayer film may have a three or more-layer structure and may be provided with a third layer in addition to a first layer and a second layer. It is preferred that the interlayer film be provided with the third layer as a surface layer of the interlayer film. When the interlayer film is provided with the third layer, the third layer is arranged on a second surface side opposite to the first surface of the first layer. When the interlayer film is provided with the third layer, the first layer is arranged between the second layer and the third layer. In this case, the third layer may be directly layered on the first layer and an additional layer may be arranged between the first layer and the third layer.

Hereinafter, the details of materials constituting the respective layers of a multi-layered interlayer film and the single-layered interlayer film will be described.

(Polyvinyl Acetal Resin or Thermoplastic Resin)

It is preferred that the interlayer film contain a thermoplastic resin and it is preferred that the interlayer film contain a polyvinyl acetal resin as the thermoplastic resin. It is preferred that the first layer (including a single-layered interlayer film) contain a thermoplastic resin (hereinafter, sometimes described as a thermoplastic resin (1)) and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermo plastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). The thermoplastic resin (1), the thermoplastic resin (2), and the thermoplastic resin (3) may be the same as or different from one another. One kind of each of the thermoplastic resin (1), the thermoplastic resin (2), and the thermoplastic resin (3) may be used alone and two or more kinds thereof may be used in combination. The polyvinyl acetal resin (1), the polyvinyl acetal resin (2), and the polyvinyl acetal resin (3) may be the same as or different from one another. One kind of each of the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film for laminated glass according to the present invention to a lamination glass member or another interlayer film is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol is generally 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, and preferably 35% by mole or less, more preferably 30% by mole or less, further preferably less than 27% by mole, and especially preferably 25% by mole or less. When the content of the hydroxyl group is the above lower limit or more, the adhesive force of the interlayer film is further heightened. In particular, when the content of the hydroxyl group of the polyvinyl acetal resin (1) is 20% by mole or more, the resin is high in reaction efficiency and is excellent in productivity, and moreover, when being less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, and preferably 35% by mole or less, and more preferably 32% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). There is a tendency for wrinkles to be easily generated in an interlayer film when the content of the hydroxyl group is controlled so as to satisfy such a relationship in order to heighten the sound insulating properties. However, in the present invention, since the thermal shrinkage ratio is controlled as mentioned above, wrinkles can be sufficiently made difficult to be generated in the interlayer film.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, each of the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, and most preferably 12% by mole or more. Each of the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, and preferably 30% by mole or less, more preferably 25% by mole or less, and further preferably 15% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

The acetylation degree of each of the polyvinyl acetal resin (2) and the polyvinyl acetal resin (3) is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, and preferably 80% by mole or less, and more preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 67% by mole or more, and preferably 75% by mole or less, and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of 8% by mole or less and an acetalization degree (a) of 66% by mole or more or a polyvinyl acetal resin (B) with an acetylation degree (b) of more than 8% by mole. The polyvinyl acetal resin (1) may be the polyvinyl acetal resin (A) and may be the polyvinyl acetal resin (B).

The acetylation degree (a) of the polyvinyl acetal resin (A) is 8% by mole or less, preferably 7.5% by mole or less, more preferably 7% by mole or less, further preferably 6.5% by mole or less, especially preferably 5% by mole or less, and preferably 0.1% by mole or more, more preferably 0.5% by mole or more, further preferably 0.8% by mole or more, and especially preferably 1% by mole or more. When the acetylation degree (a) is the above upper limit or less and the above lower limit or more, the transfer of a plasticizer can be easily controlled and the sound insulating properties of laminated glass are further heightened.

The acetalization degree (a) of the polyvinyl acetal resin (A) is 66% by mole or more, preferably 67.5% by mole or more, more preferably 70.5% by mole or more, especially preferably 71% by mole or more, further preferably 71.5% by mole or more, especially preferably 72% by mole or more, and preferably 85% by mole or less, more preferably 83% by mole or less, further preferably 81% by mole or less, and especially preferably 79% by mole or less. When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, and preferably 31% by mole or less, more preferably 30% by mole or less, further preferably 29% by mole or less, and especially preferably 28% by mole or less. When the content (a) of the hydroxyl group is the above lower limit or more, the adhesive force of the first layer is further heightened. When the content (a) of the hydroxyl group is the above upper limit or less, the sound insulating properties of laminated glass are further heightened.

The acetylation degree (b) of the polyvinyl acetal resin (B) is more than 8% by mole, preferably 9% by mole or more, more preferably 9.5% by mole or more, further preferably 10% by mole or more, especially preferably 10.5% by mole or more, and preferably 30% by mole or less, more preferably 28% by mole or less, further preferably 26% by mole or less, and especially preferably 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, and preferably 80% by mole or less, more preferably 78% by mole or less, further preferably 76% by mole or less, and especially preferably 74% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, and preferably 31% by mole or less, more preferably 30% by mole or less, further preferably 29% by mole or less, and especially preferably 28% by mole or less. When the content (b) of the hydroxyl group is the above lower limit or more, the adhesive force of the first layer is further heightened. When the content (b) of the hydroxyl group is the above upper limit or less, the sound insulating properties of laminated glass are further heightened.

It is preferred that each of the polyvinyl acetal resin (A) and the polyvinyl acetal resin (B) be a polyvinyl butyral resin.

(Plasticizer)

It is preferred that the interlayer film contain a plasticizer. It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer containing the polyvinyl acetal resin and the plasticizer to a lamination glass member or another layer is moderately heightened. The plasticizer is not particularly limited. The plasticizer (1), the plasticizer (2), and the plasticizer (3) may be the same as or different from one another. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol, di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

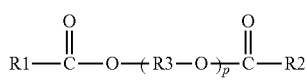

(1)

In the foregoing formula (1), R1 and R2 each represent an organic group with 2 to 10 carbon atoms, R3 represents an ethylene group, an isopropylene group, or an n-propylene group, and p represents an integer of 3 to 10. It is preferred that R1 and R2 in the foregoing formula (1) each be an organic group with 5 to 10 carbon atoms and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH), or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

The content of the plasticizer (1) (hereinafter, sometimes described as the content (1)) relative to 100 parts by weight of the thermoplastic resin (1) (100 parts by weight a polyvinyl acetal resin (1) when the thermoplastic resin (1) is the polyvinyl acetal resin (1)) is preferably 35 parts by weight or more, more preferably 50 parts by weight or more, further preferably 55 parts by weight or more, especially preferably 60 parts by weight or more, and preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

Each of the content of the plasticizer (2) (hereinafter, sometimes described as the content (2)) relative to 100 parts by weight of the thermoplastic resin (2) (100 parts by weight a polyvinyl acetal resin (2) when the thermoplastic resin (2) is the polyvinyl acetal resin (2)) and the content of the plasticizer (3) (hereinafter, sometimes described as the content (3)) relative to 100 parts by weight of the thermoplastic resin (3) (100 parts by weight a polyvinyl acetal resin (3) when the thermoplastic resin (3) is the polyvinyl acetal resin (3)) is preferably 10 parts by weight or more, more preferably parts by weight or more, and preferably 45 parts by weight or less, more preferably 40 parts by weight or less, further preferably 35 parts by weight or less, and especially preferably 32 parts by weight or less. When the content (2) and the content (3) are the above lower limit or more, the flexibility of the interlayer film is enhanced and the handling of the interlayer film is facilitated. When the content (2) and the content (3) are the above upper limit or less, the flexural rigidity is further enhanced.

For the purpose of heightening the sound insulating properties of laminated glass, it is preferred that the content (1) be larger than the content (2) and it is preferred that the content (1) be larger than the content (3). There is a tendency for wrinkles to be easily generated in an interlayer film when the content of a plasticizer is controlled so as to satisfy such a relationship in order to heighten the sound insulating properties. However, in the present invention, since the thermal shrinkage ratio is controlled as mentioned above, wrinkles can be sufficiently made difficult to be generated in the interlayer film. In particular, although there is a tendency for laminated glass prepared with an interlayer film in which the content (1) is 55 parts by weight or more to become low in flexural rigidity, by virtue of the configuration of the present invention, the flexural rigidity can be significantly improved.

From the viewpoint of further heightening the sound insulating properties of laminated glass, each of the absolute value of a difference between the content (2) and the content (1) and the absolute value of a difference between the content (3) and the content (1) is preferably 10 parts by weight or more, more preferably 15 parts by weight or more, and further preferably 20 parts by weight or more. Each of the absolute value of a difference between the content (2) and the content (1) and the absolute value of a difference between the content (3) and the content (1) is preferably 80 parts by weight or less, more preferably 75 parts by weight or less, and further preferably 70 parts by weight or less.

(Heat Shielding Compound)

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, and preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_z \qquad \text{Formula (X1)}$$

In the foregoing formula (X1), W represents tungsten, O represents oxygen, and y and z satisfy the equation of $2.0<z/y<3.0$.

$$M_xW_yO_z \qquad \text{Formula (X2)}$$

In the foregoing formula (X2), M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Ti, Ge, Sn, Pb, Sb, B, F, P, S, Se, Br, Te, Ti, Nb, V, Mo, Ta, and Re, W represents tungsten, O represents oxygen, and x, y and z satisfy the equations of $0.001 \le x/y \le 1$ and $2.0<z/y \le 3.0$.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 lam or more, and preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), the content of the heat shielding particles is preferably 0.01% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less, and most preferably 3.0% by weight or less. When the content of the heat shielding particles is the above lower limit or more and the above upper limit or less, the heat shielding properties are sufficiently enhanced and the visible light transmittance is sufficiently heightened.

It is preferred that a layer containing the heat shielding particles (a first layer, a second layer, or a third layer) contain the heat shielding particles in a proportion of 0.1 g/m$^2$ or more and 12 g/m$^2$ or less. When the proportion of the heat shielding particles lies within the above-mentioned range, the heat shielding properties are sufficiently enhanced and the visible light transmittance is sufficiently heightened. The proportion of the heat shielding particles is preferably 0.5 g/m$^2$ or more, more preferably 0.8 g/m$^2$ or more, further preferably 1.5 g/m$^2$ or more, especially preferably 3 g/m$^2$ or more, and preferably 11 g/m$^2$ or less, more preferably 10 g/m$^2$ or less, further preferably 9 g/m$^2$ or less, and especially preferably 7 g/m$^2$ or less. When the proportion is the above lower limit or more, the heat shielding properties are further enhanced. When the proportion is the above upper limit or less, the visible light transmittance is further heightened.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer, or a third layer), the content of the ultraviolet ray screening agent is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent, a dispersing agent, a surfactant, a flame retardant, an antistatic agent, a pigment, a dye, an adhesive force regulating agent other than a metal salt, a moisture-resistance improving agent, a fluorescent brightening agent, and an infrared ray absorber, as necessary. One kind of these additives may be used alone and two or more kinds thereof may be used in combination.

(Laminated Glass)

FIG. 8 is a sectional view showing an example of laminated glass prepared with the interlayer film for laminated glass shown in FIG. 1.

The laminated glass 21 shown in FIG. 8 is provided with an interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the sheet of organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

Since laminated glass prepared with the interlayer film enables double images to be suppressed, the laminated glass can be suitably used for a windshield of an automobile. It is preferred that the interlayer film be used for laminated glass constituting a head-up display (HUD). It is preferred that the laminated glass constitute a head-up display (HUD).

In the laminated glass, measured information such as the speed which is sent from a control unit and the like can be emitted from a display unit of the instrumental panel to be projected onto the windshield. As such, without making a driver of an automobile move his or her visual field downward, a front visual field and measured information can be visually observed simultaneously.

Hereinafter, the present invention will be described in more detail with reference to examples. The present invention is not limited only to these examples.

The following materials were prepared.
(Thermoplastic Resin)
Polyvinyl acetal resins having a content of the hydroxyl group, an acetylation degree, and an acetalization degree (butyralization degree) listed in the following Table 1 were used. In Table 1, the average polymerization degree of PVA used for the polyvinyl acetal resin was also described. All polyvinyl acetal resins were polyvinyl butyral resins butyralized with n-butyraldehyde.

In this connection, the content of the hydroxyl group, the acetylation degree, and the acetalization degree (butyralization degree) were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)
Triethylene glycol di-2-ethylhexanoate (3GO)
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
H-BHT (2,6-di-t-butyl-4-methylphenol, "H-BHT" available from Sakai Chemical Industry Co., Ltd.)

Example 1

Preparation of Composition for Forming First Layer:
One hundred parts by weight of a polyvinyl acetal resin shown in the following Table 1, 60 parts by weight of a plasticizer shown in the following Table 1, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a first layer.

Preparation of Composition for Forming Second and Third Layers:
One hundred parts by weight of a polyvinyl acetal resin shown in the following Table 1, 38 parts by weight of a plasticizer shown in the following Table 1, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming a second layer and a third layer.

Preparation of Interlayer Film:
The composition for forming a first layer and the composition for forming a second layer and a third layer were coextruded into an interlayer film with an extruder and the interlayer film was heated to 100° C. to 150° C. and held for a period of holding time of 1 minute, after which the temperature thereof was decreased to 25° C. and the interlayer film was wound into a roll to obtain a roll body. A three-layered interlayer film having a sectional shape in the thickness direction of a wedge-like shape and having a structure with a stack of a second layer/a first layer/a third layer was prepared. In this connection, the thickness ratio of the second layer:the first layer:the third layer was determined to be 35:10:35 at the first position apart from the one end by 0.05X toward the other end and the first layer, second layer, and the third layer each were determined to have a sectional shape in the thickness direction of a wedge-like shape. Moreover, the distance between the one end and the other end was determined to be 1 m.

Example 2

Preparation of Composition for Forming Interlayer Film:

One hundred parts by weight of a polyvinyl acetal resin shown in the following Table 1, 38 parts by weight of a plasticizer shown in the following Table 1, 0.2 parts by weight of an ultraviolet ray screening agent (Tinuvin 326), and 0.2 parts by weight of an oxidation inhibitor (H-BHT) were thoroughly mixed using a mixing roll to obtain a composition for forming an interlayer film.

Preparation of Interlayer Film:

The composition for forming an interlayer film was extruded into an interlayer film with an extruder and the interlayer film was heated to 100° C. to 150° C. and held for a period of holding time of 1 minute, after which the temperature thereof was decreased to 25° C. and the interlayer film was wound into a roll to obtain a roll body. A one-layered interlayer film having a sectional shape in the thickness direction of a wedge-like shape was prepared. Thicknesses at the first position apart from the one end by 0.05X toward the other end, the second position apart from the one end by 0.5X toward the other end, and the third position apart from the one end by 0.95X toward the other end were determined to be thicknesses shown in the following Table 1.

Comparative Example 1

A three-layered interlayer film was obtained in the same manner as that in Example 1 except that the interlayer film was not heated to 100° C. to 150° C. and held for a period of holding time of 1 minute after being coextruded.

Comparative Example 2

A one-layered interlayer film was obtained in the same manner as that in Example 2 except that the interlayer film was not heated to 100° C. to 150° C. and held for a period of holding time of 1 minute after being extruded.

Example 3

A three-layered interlayer film was obtained in the same manner as that in Example 1 except that the die temperature was changed to make the interlayer film have a thickness shown in the following Table 1.

Example 4

A one-layered interlayer film was obtained in the same manner as that in Example 2 except that the die temperature was changed to make the interlayer film have a thickness shown in the following Table 1.

Comparative Example 3

A three-layered interlayer film was obtained in the same manner as that in Example 1 except that the die temperature was changed to make the interlayer film have a thickness shown in the following Table 1 and the interlayer film was not heated to 100° C. to 150° C. and held for a period of holding time of 1 minute after being extruded.

Comparative Example 4

A one-layered interlayer film was obtained in the same manner as that in Example 2 except that the die temperature was changed to make the interlayer film have a thickness shown in the following Table 1 and the interlayer film was not heated to 100° C. to 150° C. and held for a period of holding time of 1 minute after being extruded.

Example 5

A three-layered interlayer film was obtained in the same manner as that in Example 1 except that the interlayer film was heated to 100° C. to 150° C. and held for a period of holding time of 30 seconds after being extruded.

Example 6

A one-layered interlayer film was obtained in the same manner as that in Example 2 except that the interlayer film was heated to 100° C. to 150° C. and held for a period of holding time of 30 seconds after being extruded.

(Evaluation)

(1) Thickness of Interlayer Film

A section in the thickness direction of an interlayer film was observed and the interlayer film was evaluated for the thicknesses at a first position apart from the one end by 0.05X toward the other end, a second position apart from the one end by 0.5X toward the other end, and a third position apart from the one end by 0.95X toward the other end.

(2) Thermal Shrinkage Ratio

The interlayer film obtained was cut from one end to the other end in the TD direction so as to have a length dimension in the MD direction of 10 cm. After cutting, the moisture control thereof was performed for 2 days at 20° C. and a humidity of 30% RH. Afterward, as shown in FIG. 10, from a area centered on a first position apart from the one end by 0.05X toward the other end, an area centered on a second position apart from the one end by 0.5X toward the other end, and an area centered on a third position apart from the one end by 0.95X toward the other end, respective test pieces were cut out. The test piece had a square shape of 5 cm in the MD direction and 5 cm in the TD direction. The test piece was cut out so that the center thereof was aligned with the midpoint in the MD direction of the interlayer film obtained. The test pieces were cut out so as to be centered on the first position, the second position, and the third position, respectively.

The test pieces obtained were horizontally laid on a fluororesin sheet to be allowed to stand at 150° C. for 0.5 hours. The test piece was measured for the dimension in the MD direction before and after allowed to stand at 150° C. for 0.5 hours to determine a thermal shrinkage ratio of the test piece after allowed to stand at 150° C. for 0.5 hours.

Thermal shrinkage ratio (%)=((Dimension in $MD$ direction before heating−Dimension in $MD$ direction after heating)/Dimension in $MD$ direction before heating)×100(%)

(3) Wrinkles of Interlayer Film Before Laminated Glass Preparation

An interlayer film portion was drawn out from a roll body while being made to pass through a heating furnace to be heated under an atmosphere of 50° C., after which the presence or absence of wrinkles of the interlayer film before laminated glass preparation was judged according to the following criteria.

[Criteria for Judgment in Wrinkles of Interlayer Film Before Laminated Glass Preparation]

◯: The film has no wrinkles.

Δ: The film has a few wrinkles (a certain degree in which a poor appearance of laminated glass leading to a problem does not occur).

x: The film has wrinkles (a certain degree in which a poor appearance of laminated glass leading to a problem occurs).

(4) Wrinkles of Interlayer Film after Laminated Glass Preparation

The interlayer film portion drawn out in the evaluation for the above-mentioned (3) Wrinkles of interlayer film before laminated glass preparation was cut into a size corresponding to a size of a glass plate. A pair of glass plates (clear glass, the size of 510 mm×910 mm, 2.0 mm in thickness) was prepared. An interlayer film with a size corresponding to the size of the glass plate was sandwiched between the pair of glass plates to obtain a laminate. The obtained laminate was fitted into a frame of an EPDM-made rubber tube (frame member). The rubber tube had a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass. The presence or absence of wrinkles of the interlayer film after laminated glass preparation was judged according to the following criteria.

[Criteria for Judgment in Wrinkles of Interlayer Film after Laminated Glass Preparation]

◯: The film has no wrinkles.

Δ: The film has a few wrinkles (a poor appearance of laminated glass leading to a problem does not occur).

x: The film has wrinkles (a poor appearance of laminated glass leading to a problem occurs).

The details of the interlayer film and the results are shown in the following Table 1. In this connection, in the following Table 1, the description of contents of ingredients to be blended other than the polyvinyl acetal resin and the plasticizer was omitted. For the respective layers in all of the examples and comparative examples, relative to 100 parts by weight of a polyvinyl acetal resin, 0.2 parts by weight of an ultraviolet ray screening agent (Tinuvin 326) and 0.2 parts by weight of an oxidation inhibitor (H-BHT) were used.

TABLE 1

| | | Example 1 | Example 2 | Comparative Example 1 | Comparative Example 2 | Example 3 | Example 4 | Comparative Example 3 | Comparative Example 4 | Example 4 | Example 5 | Example 6 |
|---|---|---|---|---|---|---|---|---|---|---|---|---|
| Second layer | Polyvinyl acetal resin | Kind | Average polymerization degree of PVA | 1700 | — | 1700 | 1700 | 1700 | — | 1700 | — | — | 1700 | — |
| | | Content of hydroxyl group | | 30.5 | 30.5 | 30.5 | 30.5 | 30.5 | 30.5 | 30.5 | 30.5 | 30.5 | 30.5 | 30.5 |
| | | Acetylation degree | | 1 | 1 | 1 | 1 | 1 | 1 | 1 | 1 | 1 | 1 | 1 |
| | | Acetalization degree | | 68.5 | 68.5 | 68.5 | 68.5 | 68.5 | 68.5 | 68.5 | 68.5 | 68.5 | 68.5 | 68.5 |
| | | Content (parts by weight) | | 100 | 100 | 100 | 100 | 100 | 100 | 100 | 100 | 100 | 100 | 100 |
| | Plasticizer | Kind | | 3GO | 3GO | 3GO | 3GO | 3GO | 3GO | 3GO | 3GO | 3GO | 3GO | 3GO |
| | | Content (parts by weight) | | 38 | 38 | 38 | 38 | 38 | 38 | 38 | 38 | 38 | 38 | 38 |
| First layer | Polyvinyl acetal resin | Kind | Average polymerization degree of PVA | 3000 | 1700 | 3000 | 1700 | 3000 | 1700 | 3000 | 1700 | 1700 | 3000 | 1700 |
| | | Content of hydroxyl group | | 22 | 30.5 | 22 | 30.5 | 22 | 30.5 | 22 | 30.5 | 30.5 | 22 | 30.5 |
| | | Acetylation degree | | 13 | 1 | 13 | 1 | 13 | 1 | 13 | 1 | 1 | 13 | 1 |
| | | Acetalization degree | | 65 | 68.5 | 65 | 68.5 | 65 | 68.5 | 65 | 68.5 | 68.5 | 65 | 68.5 |
| | | Content (parts by weight) | | 100 | 100 | 100 | 100 | 100 | 100 | 100 | 100 | 100 | 100 | 100 |
| | Plasticizer | Kind | | 3GO | 3GO | 3GO | 3GO | 3GO | 3GO | 3GO | 3GO | 3GO | 3GO | 3GO |
| | | Content (parts by weight) | | 60 | 38 | 60 | 38 | 60 | 38 | 60 | 38 | 38 | 60 | 38 |
| Third layer | Polyvinyl acetal resin | Kind | Average polymerization degree of PVA | 1700 | — | 1700 | — | 1700 | — | 1700 | — | — | 1700 | — |
| | | Content of hydroxyl group | | 30.5 | — | 30.5 | — | 30.5 | — | 30.5 | — | — | 30.5 | — |
| | | Acetylation degree | | 1 | — | 1 | — | 1 | — | 1 | — | — | 1 | — |
| | | Acetalization degree | | 68.5 | — | 68.5 | — | 68.5 | — | 68.5 | — | — | 68.5 | — |
| | | Content (parts by weight) | | 100 | — | 100 | — | 100 | — | 100 | — | — | 100 | — |
| | Plasticizer | Kind | | 3GO | — | 3GO | — | 3GO | — | 3GO | — | — | 3GO | — |
| | | Content (parts by weight) | | 38 | — | 38 | — | 38 | — | 38 | — | — | 38 | — |
| Thickness of interlayer film (μm) | First position (thick) | | | 1225 | 1187 | 1253 | 1272 | 1425 | 1387 | 1425 | 1387 | 1387 | 1288 | 1206 |
| | Second position (intermediate) | | | 1045 | 977 | 1087 | 1045 | 1145 | 1077 | 1145 | 1077 | 1077 | 990 | 976 |
| | Third position (thin) | | | 821 | 736 | 696 | 702 | 821 | 736 | 696 | 702 | 736 | 700 | 752 |
| Thermal shrinkage ratio of interlayer film (%) | First position (thick) | | | 41.2 | 33.5 | 40.2 | 32.5 | 42.2 | 34.7 | 40 | 31.5 | 34.7 | 34.5 | 27.7 |
| | Second position (intermediate) | | | 45.2 | 37.6 | 45.2 | 39 | 45.2 | 37.6 | 45.2 | 39 | 37.6 | 43.7 | 36.8 |
| | Third position (thin) | | | 45.2 | 37.6 | 45.2 | 39 | 45.2 | 37.6 | 45.2 | 39 | 37.6 | 49 | 42 |
| Maximum thermal shrinkage ratio of interlayer film (%) | | | | 45.2 | 37.6 | 45.2 | 39 | 45.2 | 37.6 | 45.2 | 39 | 37.6 | 49 | 42 |
| Minimum thermal shrinkage ratio of interlayer film (%) | | | | 36 | 28 | 30 | 23.1 | 38 | 29.5 | 29 | 22.5 | 29.5 | 34.5 | 27.7 |
| Absolute value of difference between maximum thermal shrinkage ratio and minimum thermal shrinkage ratio of interlayer film (%) | | | | 9.2 | 9.6 | 15.2 | 15.9 | 7.2 | 8.1 | 16.2 | 16.5 | 8.1 | 14.5 | 14.3 |
| Wrinkles in interlayer film before preparation of laminated glass | | | | ○ | ○ | x | x | ○ | ○ | x | x | ○ | △ | △ |
| Wrinkles in interlayer film after preparation of laminated glass | | | | ○ | ○ | x | x | ○ | ○ | x | ○ | ○ | △ | △ |

In this connection, the sheet of laminated glass was prepared with the interlayer film obtained, and as a result, it was confirmed that, through the evaluation for the above-mentioned (4) Wrinkles of interlayer film after laminated glass preparation, the fewer wrinkles the interlayer film has, the more laminated glass satisfactory in appearance is obtained.

EXPLANATION OF SYMBOLS 1, 1A, 1B, 1C, 1D, 1E, 1F: First layer
2, 2B, 2C, 2D, 2E, 2F: Second layer
2Fa: Portion having sectional shape in thickness direction of rectangular shape
2Fb: Portion having sectional shape in thickness direction of wedge-like shape
3, 3B, 3C, 3D: Third layer
11, 11A, 11B, 11C, 11D, 11E, 11F: Interlayer film
11a: One end
11b: The other end
21: Laminated glass
22: Lamination glass member
23: Lamination glass member
51: Roll body
61: Winding core

The invention claimed is:

1. An interlayer film for laminated glass, having a machine direction and a transverse direction and having one end and the other end being at the opposite side of the one end and having a thickness thicker than the one end,
the one end and the other end being respectively positioned at both sides in the transverse direction of the interlayer film,
the interlayer film containing a polyvinyl acetal resin, and when a distance between the one end and the other end is defined as X, the absolute value of a difference between the largest thermal shrinkage ratio among three thermal shrinkage ratios of the first thermal shrinkage ratio at 150° C. after allowed to stand at 150° C. for 0.5 hours in the machine direction on a first position apart from the one end by 0.05X toward the other end, the second thermal shrinkage ratio at 150° C. after allowed to stand at 150° C. for 0.5 hours in the machine direction on a second position apart from the one end by 0.5X toward the other end, and the third thermal shrinkage ratio at 150° C. after allowed to stand at 150° C. for 0.5 hours in the machine direction on a third position apart from the one end by 0.95X toward the other end and the smallest thermal shrinkage ratio among the three thermal shrinkage ratios being more than 0.0% and 15% or less, and the largest thermal shrinkage ratio among the first, second and third thermal shrinkage ratios being 14% or more and 56% or less, the first, second and third thermal shrinkage ratios each being measured by using a test piece which has a square shape of 5 cm in the machine direction and 5 cm in the transverse direction.

2. The interlayer film for laminated glass according to claim 1, wherein the largest thermal shrinkage ratio among the first, second and third thermal shrinkage ratios is 50% or less.

3. The interlayer film for laminated glass according to claim 1, comprising: a first layer; and
a second layer arranged on a first surface side of the first layer,
the second layer being a surface layer of the interlayer film.

4. The interlayer film for laminated glass according to claim 3, wherein the first layer contains a polyvinyl acetal resin and
the second layer contains a polyvinyl acetal resin.

5. The interlayer film for laminated glass according to claim 4, wherein a content of a hydroxyl group of the polyvinyl acetal resin in the first layer is lower than a content of a hydroxyl group of the polyvinyl acetal resin in the second layer.

6. The interlayer film for laminated glass according to claim 4, wherein the first layer contains a plasticizer and
the second layer contains a plasticizer.

7. The interlayer film for laminated glass according to claim 6, wherein a content of the plasticizer in the first layer relative to 100 parts by weight of the polyvinyl acetal resin in the first layer is larger than a content of the plasticizer in the second layer relative to 100 parts by weight of the polyvinyl acetal resin in the second layer.

8. The interlayer film for laminated glass according to claim 3, further comprising: a third layer arranged on the opposite side to the first surface side of the first layer,
the third layer being a surface layer of the interlayer film.

9. The interlayer film for laminated glass according to claim 8, wherein the third layer contains a polyvinyl acetal resin and a plasticizer.

10. The interlayer film for laminated glass according to claim 1, further having a portion with a sectional shape in the thickness direction of a wedge-like shape.

11. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

12. The interlayer film for laminated glass according to claim 1, wherein the largest thermal shrinkage ratio among the first, second and third thermal shrinkage ratios is more than 20%.

13. The interlayer film for laminated glass according to claim 1, wherein the interlayer film is wound and formed into a roll body.

14. The interlayer film for laminated glass according to claim 1, wherein the interlayer film is produced by extrusion followed by a heating step, the heating step comprising heating the interlayer film to a temperature of 100° C. to 150° C. and then holding for at least 30 seconds before decreasing to a temperature of 25° C.

15. The interlayer film for laminated glass according to claim 1, further comprising an oxidation inhibitor, the oxidation inhibitor being a phenol-based oxidation inhibitor or a phosphorus-based oxidation inhibitor.

16. The interlayer film for laminated glass according to claim 1, wherein the absolute value of a difference between the largest thermal shrinkage ratio among the first, second and third thermal shrinkage ratios and the smallest thermal shrinkage ratio among the first, second and third thermal shrinkage ratios is 13% or less.

17. The interlayer film for laminated glass according to claim 1, wherein the absolute value of the difference between the largest thermal shrinkage ratio among the first, second and third thermal shrinkage ratios and the smallest thermal shrinkage ratio among the first, second and third thermal shrinkage ratios is 0.7% or more.

* * * * *